US010423494B2

(12) United States Patent
Bushman et al.

(10) Patent No.: US 10,423,494 B2
(45) Date of Patent: *Sep. 24, 2019

(54) TRIMMING UNUSED BLOCKS FROM A VERSIONED IMAGE BACKUP OF A SOURCE STORAGE THAT IS STORED IN A SPARSE STORAGE

(71) Applicant: STORAGECRAFT TECHNOLOGY CORPORATION, Draper, UT (US)

(72) Inventors: Nathan S. Bushman, Pleasant Grove, UT (US); Thomas Frank Christensen, Salt Lake City, UT (US); David Merrill McConkie, Jr., Salt Lake City, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/284,306

(22) Filed: Oct. 3, 2016

(65) Prior Publication Data

US 2017/0286232 A1    Oct. 5, 2017

Related U.S. Application Data

(63) Continuation of application No. 15/085,743, filed on Mar. 30, 2016, now Pat. No. 9,563,633.

(51) Int. Cl.
*G06F 3/06* (2006.01)
*G06F 11/00* (2006.01)
(Continued)

(52) U.S. Cl.
CPC ........ *G06F 11/1451* (2013.01); *G06F 3/0608* (2013.01); *G06F 3/0643* (2013.01);
(Continued)

(58) Field of Classification Search
CPC ............ G06F 11/1451; G06F 16/1727; G06F 16/128; G06F 16/125; G06F 11/00; G06F 3/0608; G06F 3/0683; G06F 3/0643
See application file for complete search history.

(56) References Cited

U.S. PATENT DOCUMENTS 7,620,765 B1    11/2009  Ohr
8,244,681 B2    8/2012   Laffin
(Continued)

OTHER PUBLICATIONS

United States Patent and Trademark Office,. Notice of Allowance dated Sep. 27, 2016 in U.S. Appl. No. 15/085,743, 5 pages.
(Continued)

*Primary Examiner* — Jorge A Casanova
(74) *Attorney, Agent, or Firm* — Maschoff Brennan

(57) ABSTRACT

Trimming unused blocks from a versioned image backup of a source storage that is stored in a sparse storage. In one example embodiment, a method may include identifying a versioned image backup that is stored in a sparse storage. The sparse may store first and second versions of the versioned image backup representing states of the source storage at successive first and second points in time, respectively. The method may further include deleting the first version, identifying a first set of blocks that were allocated in the source storage at the second point in time, identifying a second set of blocks that are allocated in the sparse storage for the second version, determining a third set of blocks that are included in the second set of blocks but are not included in the first set of blocks, and trimming the third set of blocks from the second version.

19 Claims, 3 Drawing Sheets

(51) Int. Cl.
  *G06F 11/14* (2006.01)
  *G06F 16/11* (2019.01)
  *G06F 16/17* (2019.01)

(52) U.S. Cl.
  CPC ............ *G06F 3/0683* (2013.01); *G06F 11/00* (2013.01); *G06F 16/125* (2019.01); *G06F 16/128* (2019.01); *G06F 16/1727* (2019.01)

(56) References Cited

U.S. PATENT DOCUMENTS

| | | |
|---|---|---|
| 8,751,454 B1 | 6/2014 | Bushman |
| 9,152,507 B1 | 10/2015 | Bushman |
| 9,317,376 B1 | 4/2016 | Bushman |
| 2002/0028736 A1 | 3/2002 | Kishino et al. |
| 2003/0145248 A1 | 7/2003 | McNeil |
| 2009/0307286 A1 | 12/2009 | Laffin |
| 2011/0161299 A1 | 6/2011 | Prahlad |
| 2014/0164330 A1 | 6/2014 | Barnes |

OTHER PUBLICATIONS

United States Patent and Trademark Office,. Office Action dated Aug. 5, 2016 in U.S. Appl. No. 15/085,743, 10 pages.

TRIMMING UNUSED BLOCKS FROM A VERSIONED IMAGE BACKUP OF A SOURCE STORAGE THAT IS STORED IN A SPARSE STORAGE

CROSS-REFERENCE TO A RELATED APPLICATION

This application is a continuation of U.S. patent application Ser. No. 15/085,743, filed Mar. 30, 2016, which is incorporated herein by reference in its entirety.

FIELD

The embodiments disclosed herein relate to trimming unused blocks from a versioned image backup of a source storage that is stored in a sparse storage.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage as well as the locations of allocated blocks which are used by the file system for its own internal on-storage structures. The file system may also track free blocks that are neither allocated to any file nor allocated to any file system on-storage structure. The file system generally tracks allocated and/or free blocks using a specialized on-storage structure stored in the file system metadata (FSM), referred to herein as a file system block allocation map (FSBAM).

Various techniques exist for backing up a source storage. One common technique involves backing up individual files stored in the source storage on a per-file basis. Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated content of the source storage. Using this approach, individual allocated blocks are backed up if they have been changed since the previous backup. Because image backup backs up all allocated blocks of the source storage, image backup backs up both the blocks that make up the files stored in the source storage as well as the blocks that make up the file system on-storage structures such as the FSM. Also, because image backup backs up all allocated blocks rather than individual files, this approach does not generally need to be aware of the file system on-storage data structures or the files stored in the source storage, beyond utilizing the FSBAM in order to only back up allocated blocks since free blocks are not generally backed up.

An image backup can be relatively fast compared to file backup because reliance on the file system is minimized. An image backup can also be relatively fast compared to a file backup because seeking is reduced. In particular, during an image backup, blocks may be read sequentially with relatively limited seeking. In contrast, during a file backup, blocks that make up the content of individual files may be scattered, resulting in relatively extensive seeking.

One common problem that is encountered when repeatedly backing up a source storage using an image backup is the potential for the inclusion of unused blocks in successive backups. For example, a very large digital movie file may initially be stored on a source storage. The allocated blocks that correspond to the movie file may then be stored in an initial backup of the source storage. After the creation of the initial backup, the movie file may then be deleted from the source storage, thus rendering the corresponding blocks as unused blocks. As subsequent versions of the backup of the source storage are subsequently created, the unused blocks corresponding to the deleted movie file may be needlessly retained in one or more of the subsequent versions of the backup. Retaining unused blocks in the subsequent versions of the backup may increase the overall size requirements of a storage where the subsequent versions of the backup are stored and/or increase the processing time associated with restoring the subsequent versions of the backup.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to trimming unused blocks from a versioned image backup of a source storage that is stored in a sparse storage. The example embodiments disclosed herein may be employed, for example, after the deletion of an earlier version of a versioned image backup from a sparse storage, such as during a retention process, resulting in unused blocks being present in the versioned image backup. The example embodiments disclosed herein may then be employed to trim the unused blocks from the versioned image backup, which may decrease the overall size requirements of the sparse storage where the versioned image backup is stored and/or decrease the processing time associated with restoring the versioned image backup.

In one example embodiment, a method for pruning unused blocks from a versioned image backup of a source storage that is stored in a sparse storage may include identifying a versioned image backup of a source storage that is stored in a sparse storage. The sparse may store first and second versions of the versioned image backup representing states of the source storage at successive first and second points in time, respectively. The method may further include deleting the first version of the versioned image backup from the sparse storage during a retention process, identifying a first set of blocks that were allocated in the source storage at the second point in time, identifying a second set of blocks that are allocated in the sparse storage for the second version of the versioned image backup, determining a third set of blocks that are included in the second set of blocks but are not included in the first set of blocks, and, after the retention process, trimming the third set of blocks from the second version of the versioned image backup that is stored in the sparse storage.

In another example embodiment, a method for pruning unused blocks from a versioned image backup of a source storage that is stored in a sparse storage may include identifying a versioned image backup of a source storage that is stored in a sparse storage. The sparse storage may store first, second, and third versions of the versioned image backup representing states of the source storage at successive first, second, and third points in time, respectively. The method may also include, deleting the first version of the versioned image backup from the sparse storage during a retention process, identifying a second set of blocks that indicates blocks that were allocated in the source storage at the second point in time, identifying a third set of blocks that were allocated in the source storage at the third point in time, determining a first set of blocks to include blocks that are indicated as allocated in either of the second set of blocks or the third set of blocks, identifying a fourth set of blocks that are allocated in the sparse storage for the third version of the versioned image backup, determining a fifth set of blocks that are included in the fourth set of blocks but are not included in the first set of blocks, and after the retention process, trimming the fifth set of blocks from the third version of the versioned image backup that is stored in the sparse storage.

In another example embodiment, a method for pruning unused blocks from a versioned image backup of a source partition that is stored in a sparse block device may include identifying a versioned image backup of a source partition that is stored as a sparse partition in a sparse block device. The sparse block device may store first and second versions of the versioned image backup representing states of the source partition at successive first and second points in time, respectively. A size of the source partition may be reduced between the first and second points in time. The method may further include deleting the first version of the versioned image backup from the sparse block device during a retention process, identifying a first set of blocks to include blocks that are included in the source partition at the second point in time, identifying a second set of blocks to include blocks that are included in the sparse partition at the second point in time, determining a third set of blocks that are included in the second set of blocks but are not included in the first set of blocks, and after the retention process, trimming the third set of blocks from the second version of the versioned image backup that is stored in the sparse block device.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
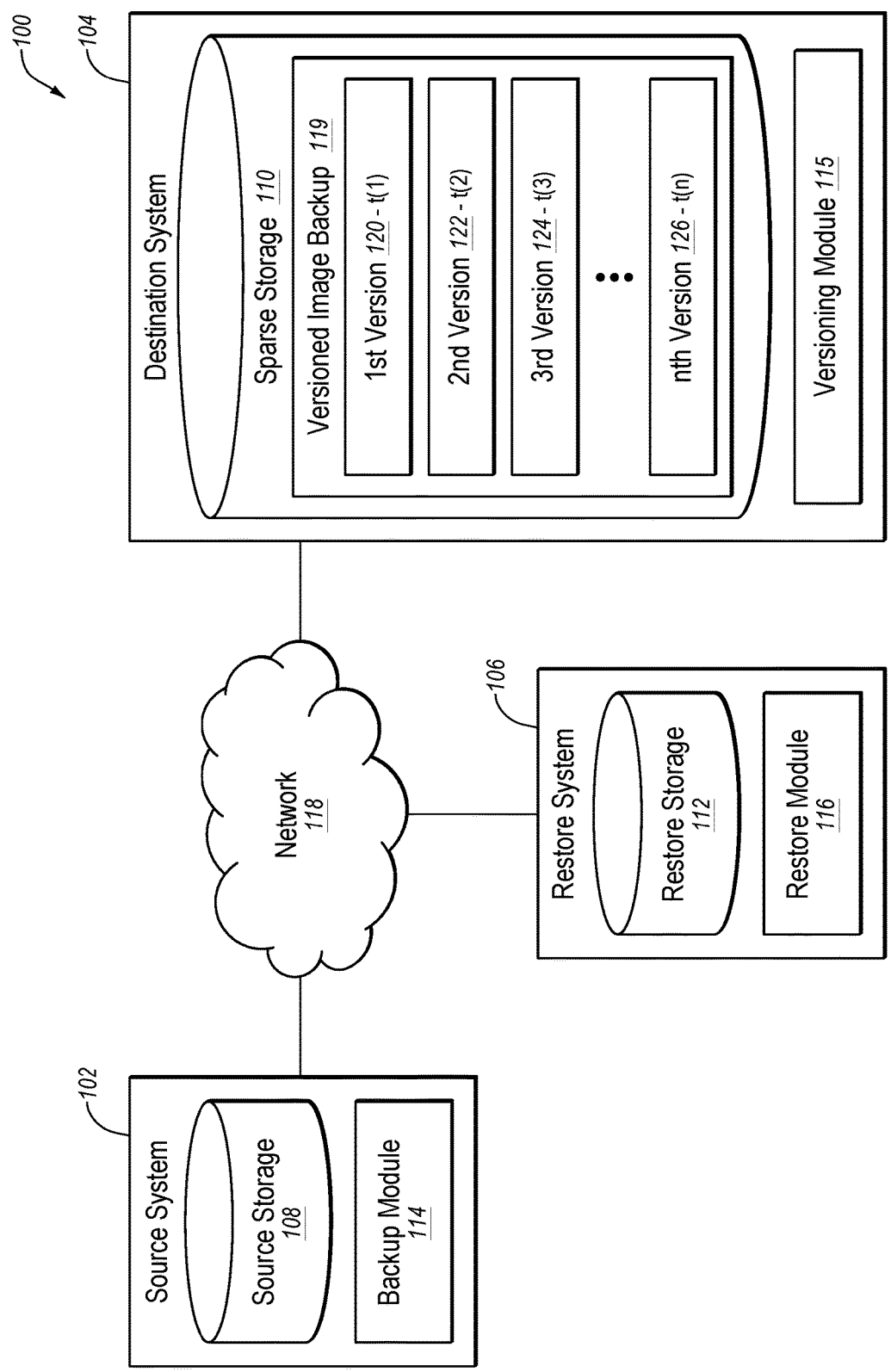
FIG. 1 is a schematic block diagram illustrating an example image backup and restore system.

The term "storage" as used herein refers to computer-readable media capable of storing data in blocks, such as one or more floppy disks, optical disks, magnetic disks, or solid state drives, flash storage devices, or some logical portion thereof such as a volume. The term "sparse storage" as used herein refers to a storage that is capable of using fewer blocks than the storage appears to be using. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data, such as file content data or metadata, by a file system of the storage. The term "free block" as used herein refers to a block in a storage that is not currently tracked as storing data, such as filed content data or metadata, by a file system of the storage. The term "backup" when used herein as a noun refers to a copy or copies of one or more blocks from a storage. The term "full image backup" as used herein refers to a full image backup of a storage that includes at least a copy of each unique allocated block of the storage at a point in time such that the full image backup can be restored on its own to recreate the state of the storage at the point in time, without being dependent on any other backup. A "full image backup" may also include nonunique allocated blocks and free blocks of the storage at the point in time. An example file format for a "full image backup" is the ShadowProtect Full (SPF) image backup format. The term "incremental image backup" as used herein refers to an at least partial backup of a storage that includes at least a copy of each unique allocated block of the storage that was changed between a previous point in time of a previous backup of the storage and the subsequent point in time of the incremental image backup, such that the incremental image backup, along with all previous backups of the storage including an initial full image backup of the storage, can be restored together as an incremental image backup chain to recreate the state of the storage at the subsequent point in time. An "incremental image backup" may also include nonunique allocated blocks and free blocks of the storage that were changed between the previous point in time and the subsequent point in time. An example file format for an "incremental image backup" is the ShadowProtect Incremental (SPI) image backup format. The term "changed block" as used herein refers to a block that was changed either because the block was previously allocated and changed or because the block was changed by being newly allocated and changed. It is understood that a "full image backup" and/or an "incremental image backup" may exclude certain undesired allocated blocks such as content blocks belonging to files whose contents are not necessary for restoration purposes, such as virtual memory pagination files and machine hibernation state files. The term "file system metadata" or "FSM" as used herein refers to metadata maintained by a file system of a storage that tracks, at any given point in time, which blocks of the storage are assigned to each file of the storage and also maintains a file system block allocation map for the storage. The term "file system block allocation map" or "FSBAM" as used herein refers to a map maintained as part of the FSM of a storage that tracks, at any given point in time, which blocks of the storage are allocated and/or which blocks of the storage are free.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114, the destination system 104 may also include a versioning module 115, and the restore system 106 may also include a restore module 116. The systems 102, 104, and 106 may be configured to communicate with one another over a network 118.

The sparse storage 110 may store a versioned image backup 119 of the source storage 108. The versioned image backup 119 may include a 1st version 120 that is based on a full image backup of the source storage 108, a 2nd version 122 that is based on a 1st incremental image backup of the source storage 108, a 3rd version 124 that is based on a 2nd incremental image backup of the source storage 108, and an nth version 126 that is based on an (n−1)th incremental image backup of the source storage 108. The 1st version 120 may be created as a result of a full image backup of the source storage 108. While the full image backup, the 1st incremental image backup, the 2nd incremental image backup 124, and the (n−1)th incremental image backup, if stored separately, would make up an incremental image backup chain where each subsequent image backup depends on all prior image backups, each of the versions 120, 122, 124, and 126 of the versioned image backup 119 are standalone image backups of the source storage 108 that independently represent states of the source storage at times t(1), t(2), t(3), and t(n), respectively. Any of the versions 120, 122, 124, and 126 of the versioned image backup 119 may be restored to the restore storage 112.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 118 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the Internet, or some combination thereof. The network 118 may also be a network emulation of a hypervisor over which one or more virtual machines and/or physical machines may communicate.

The versioned image backup 119 stored in the sparse storage 110 may be created by the backup module 114 and the versioning module 115. For example, the backup module 114 and the versioning module 115 may be one or more programs that are configured, when executed, to cause one or more processors to perform image backup operations of creating the versions 120, 122, 124, and 126 of the versioned image backup 119 based on a full image backup and multiple incremental image backups of the source storage 108. It is noted that the full and incremental image backups may initially be created on the source system 102 and then copied to the destination system 104 in order to serve as the basis for the versions 120, 122, 124, and 126 of the versioned image backup 119.

For example, a full image backup may be created to capture the state at time t(1). This image backup operation may include the backup module 114 copying all allocated blocks of the source storage 108 as allocated at time t(1) to the sparse storage 110, and then the versioning module 115 storing the allocated blocks in the sparse storage 110 as the first version 120 of the versioned image backup 119. The state of the source storage 108 at time t(1) may be captured using a snapshot in order to capture the blocks stored in the source storage 108 at time t(1) without interrupting other processes, thus avoiding downtime of the source storage 108. Similarly, the first version 120 of the versioned image backup 119 may be created on the sparse storage 110 as a snapshot of the sparse storage 110.

Next, 1st, 2nd, and (n−1)th incremental image backups may be created to capture the states at times t(2), t(3), and t(n), respectively. This may include the backup module 114 copying only changed allocated blocks of the source storage 108 present at time t(2) to the sparse storage 110, and then the versioning module 115 storing the changed allocated blocks in the sparse storage 110 as the 2nd version 122 of the versioned image backup 119. Later, the backup module 114 may copy only changed allocated blocks of the source storage 108 present at time t(3) to the sparse storage 110, and then the versioning module 115 may store the changed allocated blocks in the sparse storage 110 as the 3rd version 124 of the versioned image backup 119. Finally, the backup module 114 may copy only changed allocated blocks of the source storage 108 present at time t(n) to the sparse storage 110, and then the versioning module 115 may store the changed allocated blocks in the sparse storage 110 as the nth version 126 of the versioned image backup 119. Each incremental image backup may include only those allocated blocks from the source storage 108 that were changed after the time of the previous image backup. Thus, the 1st incremental image backup may include only those allocated blocks from the source storage 108 that were changed between time t(1) and time t(2), and the 2nd incremental image backup 124 may include only those allocated blocks from the source storage 108 that were changed between time t(2) and time t(3). As a result, as compared to the full image backup, each incremental image backup may take a relatively short time to create and consume a relatively small storage space in the sparse storage 110. The states of the source storage 108 at times t(2), t(3), and t(n) may also be captured using a snapshot, thus avoiding downtime of the source storage 108. Similarly, the 2nd version 122, 3rd version 124, and of nth version 126 of the versioned image backup 119 may be created on the sparse storage 110 as snapshots of the sparse storage 110.

Therefore, incremental image backups of the source storage 108 may be created on an ongoing basis, resulting in new versions of the versioned image backup 119 being stored in the sparse storage 110. The frequency of creating new incremental image backups may be altered as desired in order to adjust the amount of data that will be lost should the source storage 108 experience corruption of its stored blocks or become unavailable at any given point in time. The blocks from the source storage 108 can be restored to the restore storage 112 to the state at the point in time of a particular version of the versioned image backup 119 by applying the particular version to the restore storage 112.

Although only allocated blocks are included in the versioned image backup 119 discussed above, it is understood that in alternative implementations both allocated and free blocks may be backed up during the creation of a versioned image backup. This is typically done for forensic purposes, because the content of free blocks can be interesting where the free blocks contain data from a previous point in time when the blocks were in use and allocated. Therefore, the creation of versioned image backups as disclosed herein is not limited to allocated blocks but may also include free blocks.

In one example embodiment, the destination system 104 may be a network server, the sparse storage 110 may be a sparse storage of the network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 118 may include the Internet. In this example embodiment, the first desktop computer may be configured to periodically back up the volume of the first desktop computer over the Internet to the sparse storage 110 of the network server as part of a backup job by creating a full image backup and the multiple incremental image backups and then storing these backups in the sparse storage 110 as successive versions of a versioned image backup. The first desktop computer may also be configured to track incremental changes to its volume between backups in order to easily and quickly identify only those blocks that were changed for use in the creation of an incremental image backup. The second desktop computer may also be configured to restore one or more of the versions of the versioned image backup 119 from the network server over the Internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 118, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114, the versioning module 115, and the restore module 116 are the only modules disclosed in the system 100 of FIG. 1, it is understood that the functionality of the modules 114, 115, and 116 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
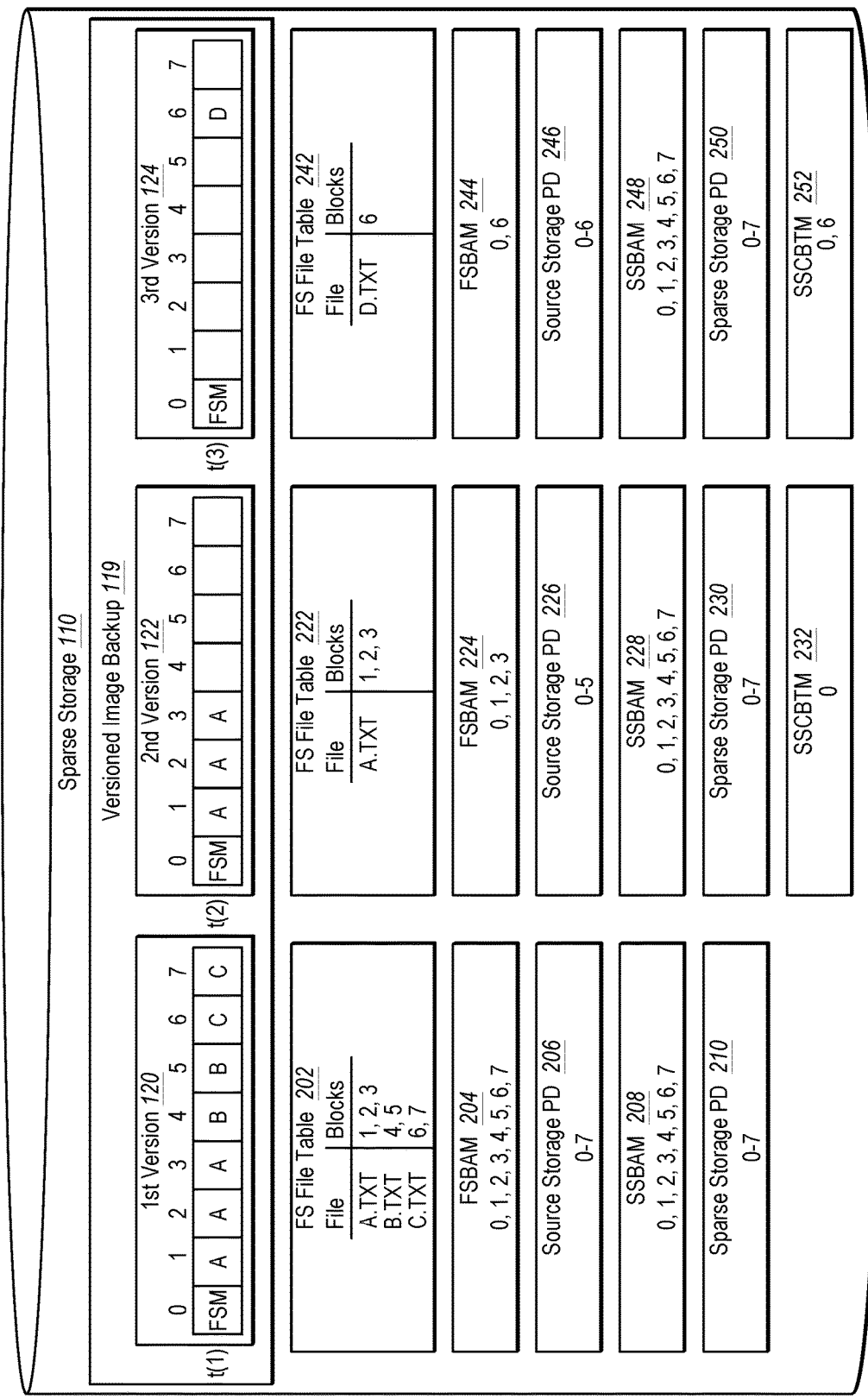
FIG. 2 is a schematic block diagram illustrating example first, second, and third versions of a versioned image backup stored on a sparse storage.

FIG. 2 is a schematic block diagram illustrating the first version 120, the second version 122, and the third version 124 of the versioned image backup 119 stored on the sparse storage 110. As disclosed in FIG. 2, the first version 120, the second version 122, and the third version 124 of the versioned image backup 119 may each include eight blocks having block positions (0)-(7), which represent eight corresponding blocks from the source storage 108 of FIG. 1. Although the first version 120, the second version 122, and the third version 124 are each depicted with eight blocks in FIG. 2, it is understood that each of the source storage 108 and the first version 120, the second version 122, and the third version 124 may include millions or billions of blocks, or potentially even more blocks.

The blocks of the versioned image backup 119 of FIG. 2 having a label therein represent blocks that are allocated at the time indicated, while the blank blocks represent blocks that are free at the time indicated. The labels in the blocks of FIG. 2 include a letter to identify the block as corresponding to file content of a particular file. For example, the label "A" in various blocks in FIG. 2 identifies the blocks as corresponding to file content of a file named "A.TXT." The blank blocks in the versioned image backup 119 of FIG. 2 may actually not actually exist in the versioned image backup 119, even though they appear to exist in the versioned image backup 119, due to the versioned image backup 119 being stored in the sparse storage 110, which is capable of using fewer blocks than the sparse storage 110 appears to be using.

The sparse storage 110 may be, for example, a sparse block device. Examples of sparse block devices include a Reliable Autonomic Distributed Object Store (RADOS) sparse Block Device (RBD), a ZFS sparse block device such as a ZFS volume, a BTRFS sparse block device, or any other form of sparse block device. In either scenario, the sparse storage 110 may support versioning using a snapshot process. Further, although the sparse storage 110 is disclosed in FIG. 2 as storing the versioned image backup 119 as an individual sparse partition, it is understood, however, that the sparse storage 110 may be a sparse block device capable of storing multiple sparse partitions of versioned image backups. In the case of multiple sparse partitions, the actual positions of the blocks as actually stored on the sparse partitions of the sparse storage 110 may be offset from the original positions of the blocks as originally stored on the source storage 108, and these offsets may be calculated during the performance of example methods disclosed herein. Additionally or alternatively, the sparse storage 110 may be a sparse file configured to be presented to a virtual machine as a block device by a hypervisor.

As disclosed in FIGS. 1 and 2, the 1st version 120, which represents the state of the source storage 108 at time t(1), includes file system metadata (FSM) in block (0) that corresponds to time t(1). The FSM includes a file system (FS) file table 202 and a file system block allocation map (FSBAM) 204. The FS file table 202 indicates that, at time t(1), the source storage 108 included a file named "A.TXT" with content in blocks (1), (2), and (3), a file named "B.TXT" with content in blocks (4) and (5), and a file named "C.TXT" with content in blocks (6) and (7). The FSBAM 204 indicates blocks that were allocated in the source storage 108 at time t(1), namely, blocks (0), (1), (2), (3), (4), (5), (6), and (7).

As part of the FSM or separate from the FSM, the 1st version 120 may include or be associated with a source storage partition definition (PD) 206. The source storage PD 206 may have been obtained, for example, from a partition table maintained by an operating system of the source storage 108 during the backup of the source storage 108.

The sparse storage 110 may maintain a sparse storage block allocation map (SSBAM) 208 and a sparse storage PD 210 associated with the 1st version 120. The SSBAM 208 indicates blocks that are allocated in the sparse storage 110 for the 1st version 120 of the versioned image backup 119, namely blocks (0), (1), (2), (3), (4), (5), (6), and (7). The sparse storage PD 210 includes that blocks (0)-(7) are included in the 1st version 120.

As disclosed in FIGS. 1 and 2, the 2nd version 122, which represents the state of the source storage 108 at time t(2), includes an FS file table 222 and an FSBAM 224. As can be seen by comparing the FS file table 222 to the FS file table 202, between time t(1) and time t(2) the file named "B.TXT" was deleted from the source storage 108, resulting in the blocks (4) and (5) being made free, and the file named "C.TXT" was deleted from the source storage 108, resulting in the blocks (6) and (7) being made free. The fact that the blocks (4), (5), (6), and (7) were made free between time t(1) and time t(2) can also be determined by comparing the FSBAM 224 to the FSBAM 204.

Further, similar to the 1st version 120, as part of the FSM or separate from the FSM, the 2nd version 122 may include or be associated with a source storage PD 226. As can be seen by comparing the source storage PD 226 to the source storage PD 206, between time t(1) and time t(2) a size of the source storage 108 (which may be a partition) was reduced from eight blocks (i.e., blocks (0)-(7)) to six blocks (i.e., blocks (0)-(5)).

Also, similar to the 1st version 120, the sparse storage 110 may maintain an SSBAM 228 and a sparse storage PD 230 associated with the 2nd version 122. However, the SSBAM 228 and the sparse storage PD 230 both incorrectly indicate that unused blocks in the 2nd version 122 are used blocks. In particular, since a file deletion on the source storage 108 may only involve updates to FSM while the content of the deleted file may be left unaltered, the deletion of the file named "B.TXT" between time t(1) and time t(2) may only result in actual changes to the FSM stored in block (0) of the 2nd version 122, resulting in the SSBAM 228 incorrectly indicating that blocks (4) and (5) are allocated in the 2nd version 122. Similarly, since a change in the size of the source storage 108 may only involve updates to metadata, such as a partition table of the source storage 108, the reduction in size from eight blocks to six blocks of the source storage 108 between time t(1) and time t(2) may not be detected by the sparse storage 110, resulting in the sparse storage PD 230 incorrectly indicating that blocks (6) and (7) remain as part of the partition in the 2nd version 122. Accordingly, when a 1st incremental backup of the source storage 108 is stored as the 2nd version 122 of the versioned image backup 119 on the sparse storage 110, the sparse storage 110 may only be aware of the change to block (0), as indicated in a sparse storage change block tracking map (SSCBTM) 232, and may not be aware that blocks (4) and (5) are free at time t(2), or that blocks (6) and (7) are not part of the source storage 108 at time t(2).

As disclosed in FIGS. 1 and 2, the 3rd version 124, which represents the state of the source storage 108 at time t(3), includes an FS file table 242 and an FSBAM 244. It is understood that the FSBAM 244, as well as the FSBAMs 224 and 204, may be stored separately from the FSM in block (0) of the versions of the versioned image backup 119. As can be seen by comparing the FS file table 242 to the FS file table 222, between time t(2) and time t(3), the file named "A.TXT" was deleted from the source storage 108, resulting in the blocks (1), (2), and (3) being made free, and a file named "D.TXT" was added to the source storage 108, resulting in the block (6) being allocated. The fact that the blocks (1), (2), and (3) were made free, and the block (6) was allocated, between time t(2) and time t(3) can also be determined by comparing the FSBAM 244 to the FSBAM 224.

Further, similar to the 2nd version 122, as part of the FSM or separate from the FSM, the 3rd version 124 may include or be associated with a source storage PD 246. As can be seen by comparing the source storage PD 246 to the source storage PD 226, between time t(2) and time t(3) a size of the source storage 108 (which may be a partition) was increased from six blocks (i.e., blocks (0)-(5)) to seven blocks (i.e., blocks (0)-(6)).

Also, similar to the 2nd version 122, the sparse storage 110 may maintain an SSBAM 248 and a sparse storage PD 250 associated with the 3rd version 124. However, the SSBAM 248 and the sparse storage PD 250 both incorrectly indicate that unused blocks in the 3rd version 124 are used blocks. In particular, the deletion of the file named "A.TXT" between time t(2) and time t(3) may only result in actual changes to the FSM stored in block (0) of the 3rd version 124, resulting in the SSBAM 248 incorrectly indicating that blocks (1), (2), and (3) are allocated in the 3rd version 124. Similarly, the increase in size from six blocks to seven blocks of the source storage 108 between time t(2) and time t(3), since the size remains smaller than the original eight blocks of the 1st version 120, may result in the sparse storage PD 250 incorrectly indicating that block (7) remains as part of the partition in the 3rd version 124. Accordingly, when a 2nd incremental backup of the source storage 108 is stored as the 3rd version 124 of the versioned image backup 119 on the sparse storage 110, the sparse storage 110 may only be aware of the change to blocks (0) and (6), as indicated in a SSCBTM 252, and may not be aware that blocks (1), (2), and (3) are free at time t(3), or that block (7) is not part of the source storage 108 at time t(3).

As disclosed in FIGS. 1 and 2, during a retention process, one or more versions of the versioned image backup 119 of FIG. 2 may be deleted in order to save storage space on the sparse storage 110. For example, a retention policy for backups of the source storage 108 may dictate that versions of the versioned image backup 119 should only be retained for two months, and therefore periodically all versions that represent points in time older than two months from the current time can be deleted from the versioned image backup 119 of FIG. 2 in order to save storage space on the sparse storage 110. However, even though deleting a version may save space on the sparse storage 110, this deletion may nevertheless result in some unused blocks being maintained in the versioned image backup unnecessarily. For example, if the 1st version 120 of the versioned image backup 119 were to be deleted during a retention process, leaving the 2nd version 122 and the 3rd version 124 of the versioned image backup 119 on the sparse storage 110, the 2nd version 122 and the 3rd version 124 may maintain unused blocks unnecessarily. For example, even though the file named "B.TXT" was deleted between time t(1) and time t(2), rendering its content in blocks (4) and (5) free in the 2nd version 122, blocks (4) and (5) are needlessly maintained in the 2nd version 122 and the 3rd version 124 due to the sparse storage 110 being unaware that these blocks are unused and instead incorrectly indicating that these blocks are allocated in the SSBAM 228 and the SSBAM 248. Similarly, even though blocks (6) and (7) were removed from the source storage 108 between time t(1) and time t(2), rendering blocks (6) and (7) unused in the 2nd version 122, blocks (6) and (7) are needlessly maintained in the 2nd version 122, and block (7) is needlessly maintained in the 3rd version 124, due to the sparse storage 110 being unaware that these blocks are unused and instead incorrectly indicating that these blocks are allocated in the sparse storage PD 230 and the sparse storage PD 250.

The example embodiments disclosed herein may be employed, for example, after a retention process deletes an earlier version of the versioned image backup 119 from the sparse storage 110, resulting in unused blocks being present in the versioned image backup 119. The example embodiments disclosed herein may then be employed to prune the unused blocks from the versioned image backup 119. For example, continuing with the previous example where the 1st version 120 of the versioned image backup 119 was deleted during a retention process, and the 2nd version 122 needlessly maintained the unused blocks in block positions (4), (5), (6), and (7), the example embodiments disclosed herein may be employed to prune the unused blocks in block positions (4), (5), (6), and (7) from the 2nd version 122 of the versioned image backup 119. This pruning may decrease the overall size requirements of the sparse storage 110 where the versioned image backup 119 is stored and/or decrease the processing time associated with restoring the versioned image backup 119.

Figure 3:
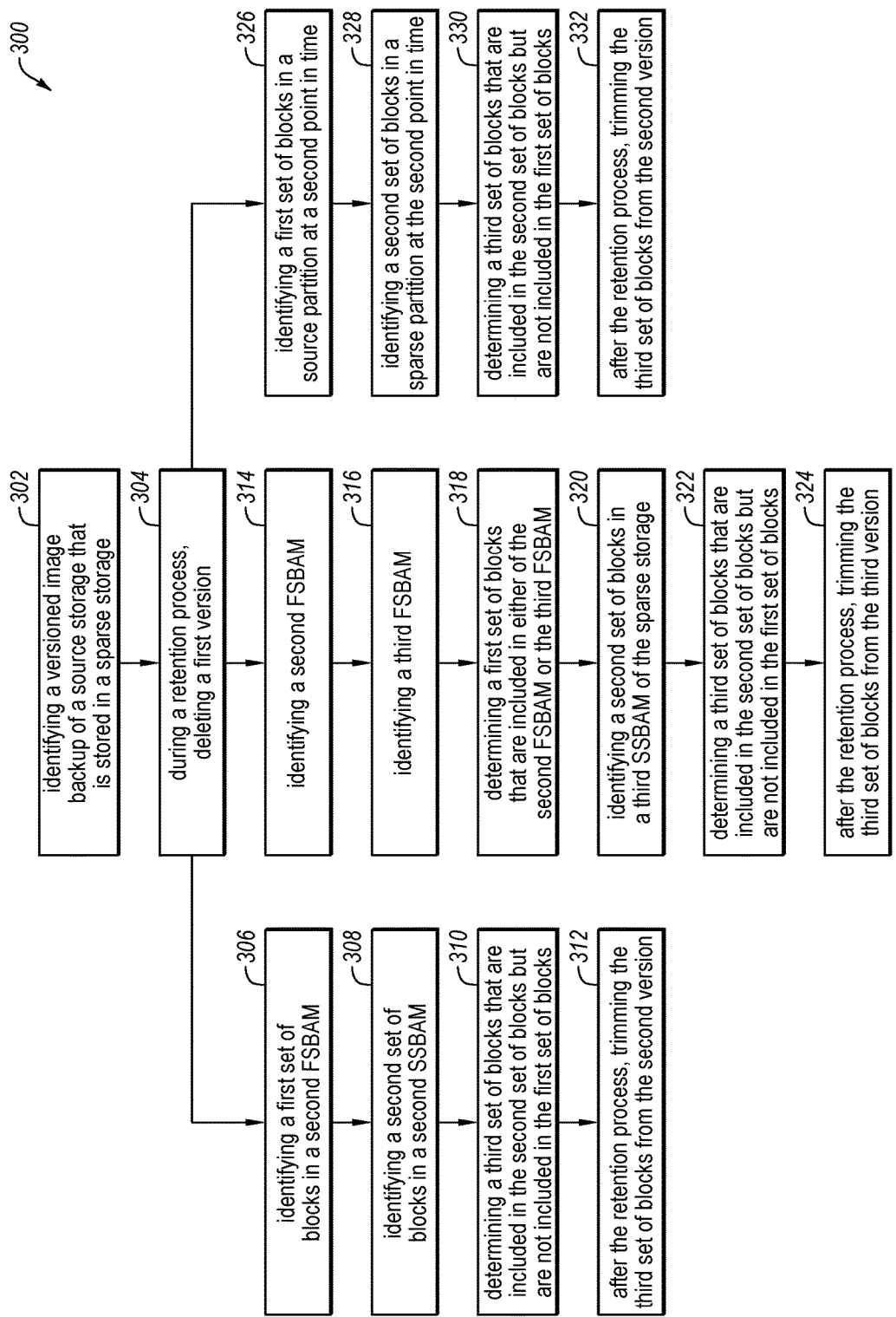
FIG. 3 is a schematic flowchart illustrating an example method for pruning unused blocks from a versioned image backup of a source storage that is stored in a sparse storage.

FIG. 3 is a schematic flowchart illustrating an example method 300 for pruning unused blocks from a versioned image backup of a source storage that is stored in a sparse storage. The method 300 may be implemented, in at least some embodiments, by one or more of the backup module 114 and the versioning module 115 of FIG. 1. For example, the backup module 114 and the versioning module 115 may each be one or more programs, stored on one or more non-transitory computer-readable media, that are configured, when executed, to cause one or more processors to perform one or more of the steps of the method 300. Although illustrated as discrete steps, various steps may be divided into additional steps, combined into fewer steps, reordered, or eliminated, depending on the desired implementation. The method 300 will be discussed with reference to FIGS. 1, 2, and 3.

The method 300 of FIG. 3 may include step 302 of identifying a versioned image backup of a source storage that is stored in a sparse storage. The sparse storage may support versioning using a snapshot process, and the sparse storage may store first and second versions of the versioned image backup representing states of the source storage at successive first and second points in time, respectively. For example, the versioning module 115 of FIG. 1 may identify, at step 302, the versioned image backup 119 that is stored in the sparse storage 110, as disclosed in FIGS. 1 and 2. The sparse storage 110 may support versioning using a snapshot process, and the sparse storage 110 may store the 1st version 120 and the second version 122 of the versioned image backup 119 that represent states of the source storage 108 at time t(1) and time t(2), respectively.

The method 300 of FIG. 3 may include step 304 of, during a retention process, deleting the first version of the versioned image backup from the sparse storage. For example, the backup module 114 and/or the versioning module 115 of FIG. 1 may, during a retention process, delete, at step 304, the 1st version 120 of the versioned image backup 119 from the sparse storage 110 of FIG. 2.

After step 304, the method 300 may include steps 306-312, steps 314-324, or steps 326-332, or some combination thereof. For example, steps 306-312 may be employed in a scenario where the sparse storage 110 is capable of trimming individual versions (e.g., the 2nd version 122 or the 3rd version 124) of the versioned image backup 119, steps 314-324 may be employed in a scenario where the sparse storage 110 is not capable of trimming an intermediate version (e.g., the 2nd version 122) of the versioned image backup 119 but is instead only capable of trimming the most recent version (e.g., the 3rd version 124) of the versioned image backup 119, and steps 326-332 may be employed in a scenario where the sparse storage 110 stores two versions (e.g., the 1st version 120 and the 2nd version 122) of the versioned image backup 119 of the source storage 108 that was reduced in partition size (e.g., from eight blocks to six blocks) between the two versions. It is understood, however, that steps 306-312, steps 314-324, or steps 326-332, or some combination thereof, may be employed in scenarios other than those listed above.

The method 300 of FIG. 3 may include step 306 of identifying a first set of blocks to include blocks that are indicated as allocated in a second FSBAM that indicates blocks that were allocated in the source storage at the second point in time. For example, the versioning module 115 of FIG. 1 may identify, at step 306, a first set of blocks to include blocks (0), (1), (2), and (3) that are indicated as allocated in the FSBAM 224 that indicates blocks that were allocated in the source storage 108 at time t(2), as disclosed in FIGS. 1 and 2.

The method 300 of FIG. 3 may include step 308 of identifying a second set of blocks to include blocks that are indicated as allocated in a second SSBAM that indicates the blocks that are allocated in the sparse storage for the second version of the versioned image backup. For example, the versioning module 115 of FIG. 1 may identify, at step 308, a second set of blocks to include blocks (0), (1), (2), (3), (4), (5), (6), and (7) that are indicated as allocated in the SSBAM 228 that indicates blocks that were allocated in the sparse storage 110 for the 2nd version 122 of the versioned image backup 119, as disclosed in FIG. 2.

The method 300 of FIG. 3 may include step 310 of determining a third set of blocks that are included in the second set of blocks but are not included in the first set of blocks. For example, the versioning module 115 of FIG. 1 may determine, at step 310, a third set of blocks (4), (5), (6), and (7) that are included in the second set of blocks (i.e., blocks (0), (1), (2), (3), (4), (5), (6), and (7)) but are not included in the first set of blocks (i.e., blocks (0), (1), (2), and (3)).

The method 300 of FIG. 3 may include step 312 of, after the retention process, trimming the third set of blocks from the second version of the versioned image backup that is stored in the sparse storage. For example, the versioning module 115 of FIG. 1 may, after the retention process of step 304 in which the 1st version 120 was deleted, trim, at step 312, the third set of blocks (i.e., blocks (4), (5), (6), and (7)) from the 2nd version 122 of the versioned image backup 119 that is stored in the sparse storage 110 of FIG. 2. Where the sparse storage 110 is an RBD, a ZFS sparse block device, or a BTRFS sparse block device, the trimming at step 312 may be accomplished by sending one or more trim commands to a storage system of the RBD, of the ZFS sparse block device, or of the BTRFS sparse block device. Additionally or alternatively, the trimming at step 312 may be performed when a system resource utilization falls below a predefined threshold.

Therefore, where the unused blocks (4), (5), (6), and (7) result from the deletion of the 1st version 120 in a retention process and from the deletion of the file named "B.TXT" and the file named "C.TXT" in the source storage 108 between time t(1) and time t(2), step 306-312 may be employed to prune the unused blocks (4), (5), (6), and (7) from the 2nd version 122 of the versioned image backup 119 in the sparse storage 110. This pruning of unused blocks from the sparse storage 110 may decrease the overall size requirements of the sparse storage 110 where the versioned image backup 119 is stored and/or decrease the processing time associated with restoring the versioned image backup 119.

As noted above, after step 304, the method 300 may include steps 314-324.

The method 300 of FIG. 3 may include step 314 of identifying a second FSBAM that indicates blocks that were allocated in the source storage at the second point in time. For example, the versioning module 115 of FIG. 1 may identify, at step 314, the FSBAM 224 that indicates that the blocks in block positions (0), (1), (2), and (3) were allocated in the source storage 108 at time t(2), as disclosed in FIGS. 1 and 2.

The method 300 of FIG. 3 may include step 316 of identifying a third FSBAM that indicates blocks that were allocated in the source storage at the third point in time. For example, the versioning module 115 of FIG. 1 may identify, at step 316, the FSBAM 244 that indicates that the blocks in block positions (0) and (6) were allocated in the source storage 108 at time t(3), as disclosed in FIGS. 1 and 2.

The method 300 of FIG. 3 may include step 318 of determining a first set of blocks to include blocks that are indicated as allocated in either of the second FSBAM or the third FSBAM. For example, the versioning module 115 of FIG. 1 may determine, at step 318, a first set of blocks to include the blocks (0), (1), (2), (3), and (6) that are indicated as allocated in either the FSBAM 224 (i.e., blocks (0), (1), (2), and (3)) or the FSBAM 244 (i.e., blocks (0) and (6)).

The method 300 of FIG. 3 may include step 320 of determining a second set of blocks to include blocks that are indicated as allocated in a third SSBAM that indicates the blocks that are allocated in the sparse storage for the third version of the versioned image backup. For example, the versioning module 115 of FIG. 1 may determine, at step 320, a second set of blocks to include the blocks in block positions (0), (1), (2), (3), (4), (5), (6), and (7) that are indicated as allocated in the third SSBAM 248.

The method 300 of FIG. 3 may include step 322 of determining a third set of blocks that are included in the second set of blocks but are not included in the first set of blocks. For example, the versioning module 115 of FIG. 1 may determine, at step 322, a third set of blocks (4), (5), and (7) that are included in the second set of blocks (i.e., blocks (0), (1), (2), (3), (4), (5), (6), and (7)) but are not included in the first set of blocks (i.e., blocks (0), (1), (2), (3), and (6)).

The method 300 of FIG. 3 may include step 324 of, after the retention process, trimming the third set of blocks from the third version of the versioned image backup that is stored in the sparse storage. For example, the versioning module 115 of FIG. 1 may, after the retention process of step 304 in which the 1st version 120 was deleted, trim, at step 324, the third set of blocks (i.e., blocks (4), (5), and (7)) from the 3rd version 124 of the versioned image backup 119 that is stored in the sparse storage 110 of FIG. 2. Where the sparse storage 110 is an RBD, a ZFS sparse block device, or a BTRFS sparse block device, the trimming at step 324 may be accomplished by sending one or more trim commands to a storage system of the RBD, of the ZFS sparse block device, or of the BTRFS sparse block device. Additionally or alternatively, the trimming at step 324 may be performed when a system resource utilization falls below a predefined threshold.

Therefore, where the unused blocks (4), (5), and (7) result from the deletion of the 1st version 120 in a retention process and from the deletion of the file named "B.TXT" and the file named "C.TXT" in the source storage 108 between time t(1) and time t(2), steps 314-324 may be employed to prune the unused blocks (4), (5), and (7) from the 3rd version 124 of the versioned image backup 119 in the sparse storage 110. This pruning of unused blocks from the sparse storage 110 may decrease the overall size requirements of the sparse storage 110 where the versioned image backup 119 is stored and/or decrease the processing time associated with restoring the versioned image backup 119.

As noted above, after step 304, the method 300 may include steps 326-332.

The method 300 of FIG. 3 may include step 326 of identifying a first set of blocks to include blocks that are included in the source partition at the second point in time. For example, the versioning module 115 of FIG. 1 may identify, at step 326, a first set of blocks (0)-(5) that are included in the source storage 108 at time t(2). This identification may be made, for example, by accessing the source storage PD 226 of the source storage 108.

The method 300 of FIG. 3 may include step 328 of identifying a second set of blocks to include blocks that are included in the sparse partition at the second point in time. For example, the versioning module 115 of FIG. 1 may identify, at step 328, a second set of blocks (0)-(7) that are included in the sparse storage 110 at time t(2). This identification may be made, for example, by accessing the sparse storage PD 230 of the sparse storage 110.

The method 300 of FIG. 3 may include step 330 of determining a third set of blocks that are included in the second set of blocks but are not included in the first set of blocks. For example, the versioning module 115 of FIG. 1 may determine, at step 330, a third set of blocks (6) and (7) that are included in the second set of blocks (i.e., blocks (0)-(7)) but are not included in the first set of blocks (i.e., blocks (0)-(5)).

The method 300 of FIG. 3 may include step 332 of, after the retention process, trimming the third set of blocks from the second version of the versioned image backup that is stored in the sparse storage. For example, the versioning module 115 of FIG. 1 may, after the retention process of step 304 in which the 1st version 120 was deleted, trim, at step 332, the third set of blocks (i.e., blocks (6) and (7)) from the 2nd version 122 of the versioned image backup 119 that is stored in the sparse storage 110 of FIG. 2. Where the sparse storage 110 is an RBD, a ZFS sparse block device, or a BTRFS sparse block device, the trimming at step 332 may be accomplished by sending one or more trim commands to a storage system of the RBD, of the ZFS sparse block device, or of the BTRFS sparse block device. Additionally or alternatively, the trimming at step 332 may be performed when a system resource utilization falls below a predefined threshold.

Therefore, where the unused blocks in block positions (6) and (7) of the 2nd version 122 results from the deletion of the 1st version 120 in a retention process and from the size of the partition of the source storage 108 being reduced between time t(1) and time t(2), steps 326-332 may be employed to prune the unused blocks in block positions (6) and (7) from the 2nd version 122 of the versioned image backup 119 in the sparse storage 110. This pruning of unused blocks from the sparse storage 110 may decrease the overall size requirements of the sparse storage 110 where the versioned image backup 119 is stored and/or decrease the processing time associated with restoring the versioned image backup 119.

It is understood that the foregoing discussion of the method 300 is but one possible implementation of a method for pruning unused blocks from a versioned image backup of a source storage that is stored in a sparse storage, and various modifications are possible and contemplated. For example, the method 300 may be modified to perform only steps 302-312, only steps 302, 304, and 314-324, or only steps 302, 304, and 326-332. Alternatively, some combination of steps 302-332 may be performed.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for pruning unused blocks from a versioned image backup of a source storage that is stored in a sparse storage, the method comprising:
identifying a versioned image backup of a source storage that is stored in a sparse storage, the sparse storage storing first and second versions of the versioned image backup representing states of the source storage at successive first and second points in time, respectively;
during a retention process, deleting the first version of the versioned image backup from the sparse storage;
identifying a first set of blocks that were allocated in the source storage at the second point in time;
identifying a second set of blocks that are allocated in the sparse storage for the second version of the versioned image backup;
determining a third set of blocks that are included in the second set of blocks but are not included in the first set of blocks; and
after the retention process, trimming the third set of blocks from the second version of the versioned image backup that is stored in the sparse storage.

2. The method of claim 1, wherein:
the sparse storage is a sparse block device;
the versioned image backup is stored in the sparse block device as a sparse partition of the sparse block device; and
the identifying of the first set of blocks further includes calculating offsets for the first set of blocks that correspond to actual positions of the blocks as stored in the sparse block device.

3. The method of claim 2, wherein the sparse block device is a RADOS sparse Block Device (RBD), a ZFS sparse block device, or a BTRFS sparse block device.

4. The method of claim 3, wherein the trimming of the third set of blocks includes trimming the third set of blocks from the second version of the versioned image backup that is stored in the sparse storage by sending one or more trim commands to a storage system of the RBD, of the ZFS sparse block device, or of the BTRFS sparse block device.

5. The method of claim 1, wherein the sparse storage is a sparse file configured to be presented to a virtual machine as a block device by a hypervisor.

6. The method of claim 1, wherein the trimming of the third set of blocks includes trimming the third set of blocks from the second version of the versioned image backup that is stored in the sparse storage when a system resource utilization falls below a predefined threshold.

7. One or more non-transitory computer-readable media storing one or more programs that are configured, when executed, to cause one or more processors to perform the method as recited in claim 1.

8. A method for pruning unused blocks from a versioned image backup of a source storage that is stored in a sparse storage, the method comprising:
identifying a versioned image backup of a source storage that is stored in a sparse storage, the sparse storage storing first, second, and third versions of the versioned image backup representing states of the source storage at successive first, second, and third points in time, respectively;
during a retention process, deleting the first version of the versioned image backup from the sparse storage;
identifying a second set of blocks that were allocated in the source storage at the second point in time;
identifying a third set of blocks that were allocated in the source storage at the third point in time;
determining a first set of blocks to include blocks that are indicated as allocated in either of the second set of blocks or the third set of blocks;
identifying a fourth set of blocks that are allocated in the sparse storage for the third version of the versioned image backup;

determining a fifth set of blocks that are included in the fourth set of blocks but are not included in the first set of blocks; and after the retention process, trimming the fifth set of blocks from the third version of the versioned image backup that is stored in the sparse storage.

9. The method of claim 8, wherein:

the sparse storage is a sparse block device;

the versioned image backup is stored in the sparse block device as a sparse partition of the sparse block device; and the determining of the first set of blocks further includes calculating offsets for the first set of blocks that correspond to actual positions of the blocks as stored in the sparse block device.

10. The method of claim 9, wherein the sparse block device is a RADOS sparse Block Device (RBD), a ZFS sparse block device, or a BTRFS sparse block device.

11. The method of claim 10, wherein the trimming of the fifth set of blocks includes trimming the fifth set of blocks from the third version of the versioned image backup that is stored in the sparse storage by sending one or more trim commands to a storage system of the RBD, of the ZFS sparse block device, or of the BTRFS sparse block device.

12. The method of claim 8, wherein the sparse storage is a sparse file configured to be presented to a virtual machine as a block device by a hypervisor.

13. The method of claim 8, wherein the trimming of the fifth set of blocks includes trimming the fifth set of blocks from the third version of the versioned image backup that is stored in the sparse storage when a system resource utilization falls below a predefined threshold.

14. One or more non-transitory computer-readable media storing one or more programs that are configured, when executed, to cause one or more processors to perform the method as recited in claim 8.

15. A method for pruning unused blocks from a versioned image backup of a source partition that is stored in a sparse block device, the method comprising:

identifying a versioned image backup of a source partition that is stored as a sparse partition in a sparse block device, the sparse block device storing first and second versions of the versioned image backup representing states of the source partition at successive first and second points in time, respectively, a size of the source partition being reduced between the first and second points in time;

during a retention process, deleting the first version of the versioned image backup from the sparse block device;

identifying a first set of blocks to include blocks that are included in the source partition at the second point in time;

identifying a second set of blocks to include blocks that are included in the sparse partition at the second point in time;

determining a third set of blocks that are included in the second set of blocks but are not included in the first set of blocks; and after the retention process, trimming the third set of blocks from the second version of the versioned image backup that is stored in the sparse block device.

16. The method of claim 15, wherein:

the determining of the first set of blocks further includes calculating offsets for the first set of blocks that correspond to actual positions of the blocks as stored in the sparse block device.

17. The method of claim 16, wherein:

the sparse block device is a RADOS sparse Block Device (RBD), a ZFS sparse block device, or a BTRFS sparse block device; and the trimming of the third set of blocks includes trimming the third set of blocks from the second version of the versioned image backup that is stored in the sparse block device by sending one or more trim commands to a storage system of the RBD, of the ZFS sparse block device, or of the BTRFS sparse block device.

18. The method of claim 15, wherein the trimming of the third set of blocks includes trimming the third set of blocks from the second version of the versioned image backup that is stored in the sparse block device when a system resource utilization falls below a predefined threshold.

19. One or more non-transitory computer-readable media storing one or more programs that are configured, when executed, to cause one or more processors to perform the method as recited in claim 15.

* * * * *